United States Patent [19]
Morikiyo et al.

[11] Patent Number: 5,647,474
[45] Date of Patent: Jul. 15, 1997

[54] STRUCTURE FOR PREVENTING POSITION DEVIATION OF A TRUCK LOADED ON A TRAVERSER

[75] Inventors: Akira Morikiyo, Tokorozawa; Koichi Mizuguchi, Higashiyamato; Susumu Kawano, Iruma; Kenji Umezawa, Tokorozawa; Koji Kato, Hanno, all of Japan

[73] Assignee: Tsubakimoto Chain Co., Osaka, Japan

[21] Appl. No.: 500,406

[22] Filed: Jul. 10, 1995

[30] Foreign Application Priority Data

Jul. 13, 1994 [JP] Japan .................. 6-183082

[51] Int. Cl.⁶ .................................. B65G 37/00
[52] U.S. Cl. ............. 198/465.1; 104/50; 104/172.3; 104/172.5
[58] Field of Search .............. 104/172.1, 172.3, 104/172.5, 50, 48; 198/465.1

[56] References Cited

U.S. PATENT DOCUMENTS

| | | | |
|---|---|---|---|
| 2,997,002 | 8/1961 | Melmer | 104/50 |
| 3,442,223 | 5/1969 | Graham | 104/50 |
| 3,919,945 | 11/1975 | Kojyo | 104/50 |
| 4,625,857 | 12/1986 | Kuehl | 198/465.1 |

FOREIGN PATENT DOCUMENTS

| | | |
|---|---|---|
| 50-55078 | 5/1975 | Japan. |
| 53-132190 | 10/1978 | Japan. |

*Primary Examiner*—D. Glenn Dayoan
*Attorney, Agent, or Firm*—Armstrong, Westerman, Hattori, McLeland & Naughton

[57] ABSTRACT

The present invention provides a traverser, which includes a support member driven by a chain and movable between a carry-in rail and carry-out rail which are disposed parallel with each other. The support member transfers a truck from said carry-in rail to said carry-out rail. A groove for receiving a flange of a wheel of the truck is formed in an upper surface of the support member.

1 Claim, 6 Drawing Sheets

5,647,474

STRUCTURE FOR PREVENTING POSITION DEVIATION OF A TRUCK LOADED ON A TRAVERSER

FIELD OF THE INVENTION

The present invention relates generally to a traverser wherein a truck is conveyed while being loaded on a support member of the traverser and more particularly, to a structure for preventing position deviation of the truck on the support member.

BACKGROUND OF THE INVENTION

Conventionally, a traverser is used, for example, as shown in FIG. 6, in an automobile assembly plant, which provides a carry-in rail 11, 11 and a carry-out rail 12, 12, disposed parallel to each other, and a traverser 10 interconnecting the two ends of the carry-in rail 11 and the carry-out rail 12, wherein the traverser 10 includes a support member 13 driven by a pair of chains (not shown) and reciprocating between the end of the paralleled rails 11, 12. As will be apparent from FIG. 7, the support member 13 includes a flat upper surface on which a truck A is loaded.

The truck A, on which a car body A which is being assembled is loaded, runs along the carry-in rail 11 and is transferred to the support member 13 at the end of the carry-in rail 11. Then, the truck A is conveyed to the end of the carry-out rail 12 for transfer to the carry-out rail 12 to run thereon.

In this way, the traverser 10 serves to change the running direction of the truck A.

However, because the upper surface of the support member 13 is flat, when the support member 13 starts or stops, the truck A slides thereon by means of the force of inertia in a right and left direction as viewed in FIG. 7. Therefore, even if the expected stop position of the support member 13 is predetermined with respect to the carry-out rail 12, the actual stop position of the wheel H of the truck A might be deviated relative to the carry-out rail 12, so that the truck A could not be transferred to the carry-out rail 12.

In anticipation of more or less position deviation, sector-shaped guide members 14, 14 are mounted on the carry-out rail at the end portion thereof, FIG. 6, thereby guiding the deviated wheel H to the carry-out rail 12.

It is noted that guide members 15, 15, FIG. 6, are mounted on the carry-in rail 11 at the end portion thereof, because the carry-in rail 11 can be used as a carry-out rail, while the carry-out rail 12 can be used as a carry-in rail.

However, such a conventional traverser has problems as follows:

(1) The number of obstructive, projecting objects increases proportional to the number of guide members 14, 15 which project from the floor, with the result that the operators' feet are endangered.

(2) When the truck A slips on the support member 13, the wheel H and the support member 13 are slightly damaged.

(3) The truck A sometimes slips on the support member 13, not parallel but at an angle with respect thereto. When this happens, because the wheel H forces its entry into the carry-out rail 12, it cannot smoothly enter the carry-out rail 12, with the result that the wheel H sometimes damages the rail 12 or is damaged thereby.

(4) Even though the guide members 14 are mounted on the carry-out rail 12 at the end thereof, the wheel H could not enter the carry-out rail 12 in the event that there is excessive slipping of the wheel H.

SUMMARY OF THE INVENTION

The preferred embodiment of the present invention provides a traverser which includes: a carry-in rail and a carry-out rail, disposed parallel to each other; a chain mounted between the carry-out rail and carry-out rail; a support member being driven by the chain and movable between each end of the carry-in rail and carry-out rail, the support member transferring a truck running from the carry-in rail to the carry-out rail; and a groove formed on an upper surface of the support member for receiving a flange of a wheel of the truck.

According to the traverser of the present invention, the support member, loaded with a truck, moves between the carry-in rail to the carry-out rail. The truck transfers from the carry-in rail to the support member, guided by the flange of the wheel and the groove.

It is an object of the present invention to prevent the slip of the truck on the supporting member when stopping and starting by the wheel of the truck loaded on the support member being engage with a groove.

DETAILED DESCRIPTION OF THE PREFERRED EMBODIMENT

Referring to FIG. 1 through 5, the preferred embodiment of the present invention will now be described in detail.

Figure 1:
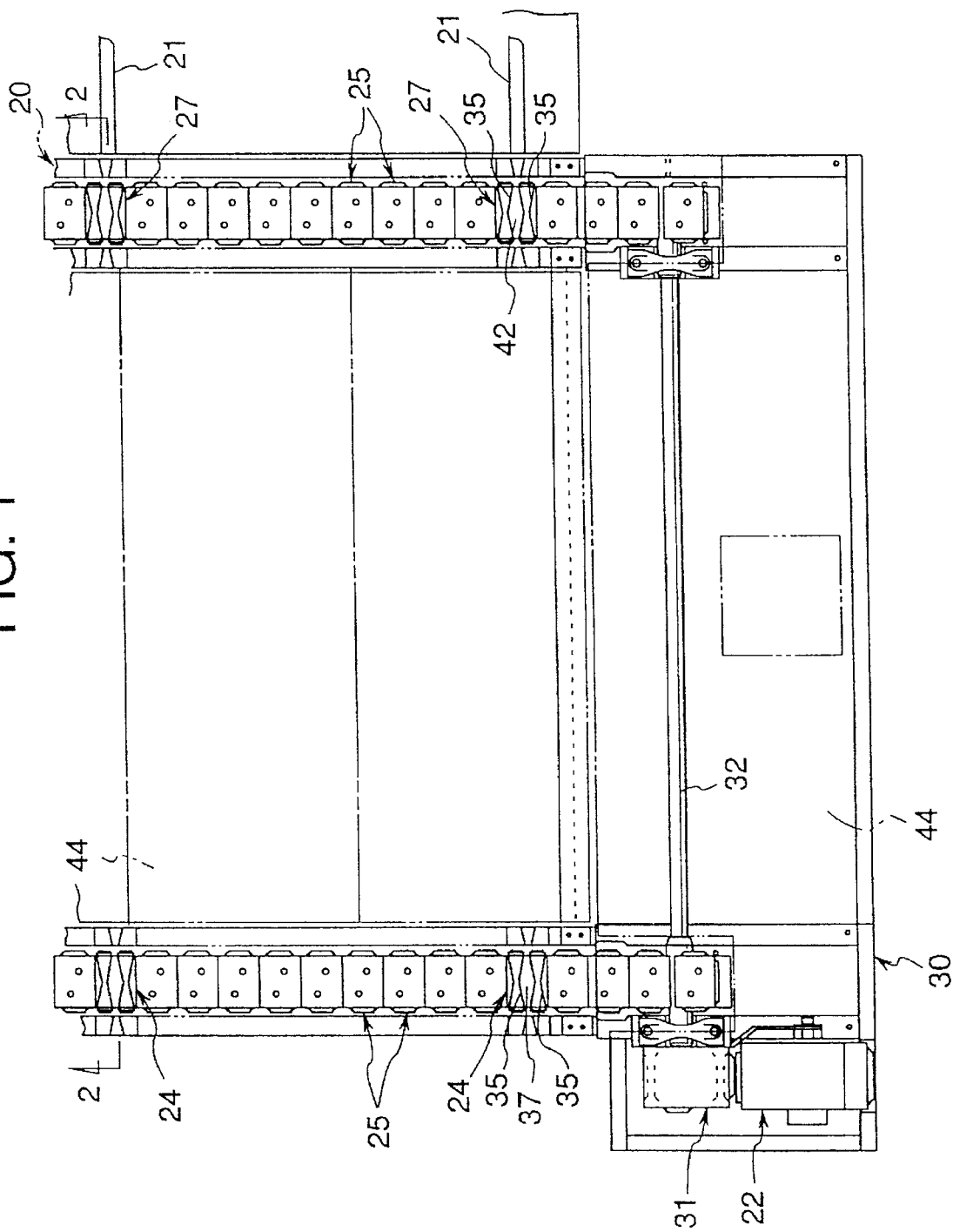
FIG. 1 is a plan view of an embodiment of the present invention's structure for preventing position deviation of a truck loaded on a traverser.
Figure 6:
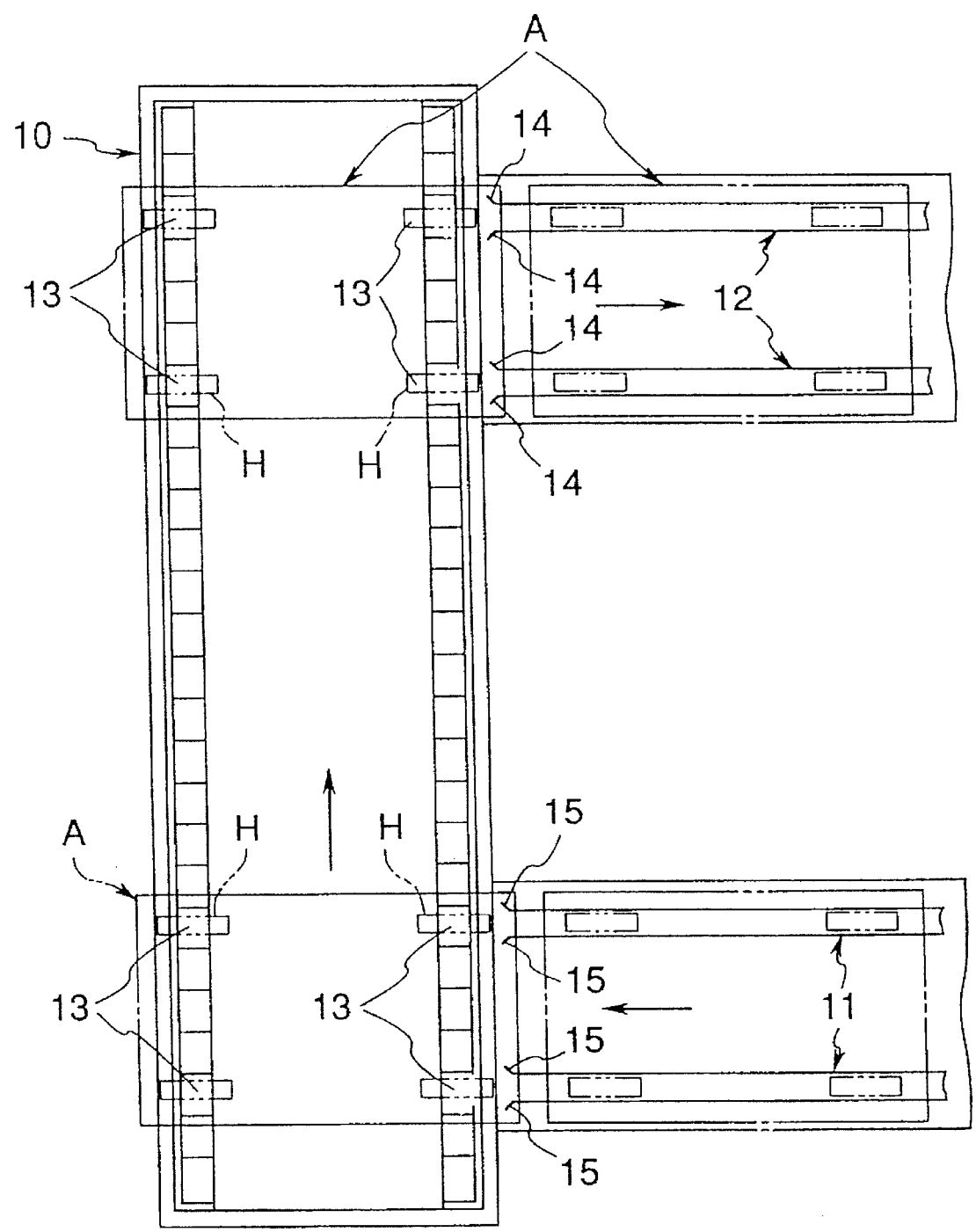
FIG. 6 is a plan view of a conventional traverser.
Figure 7:
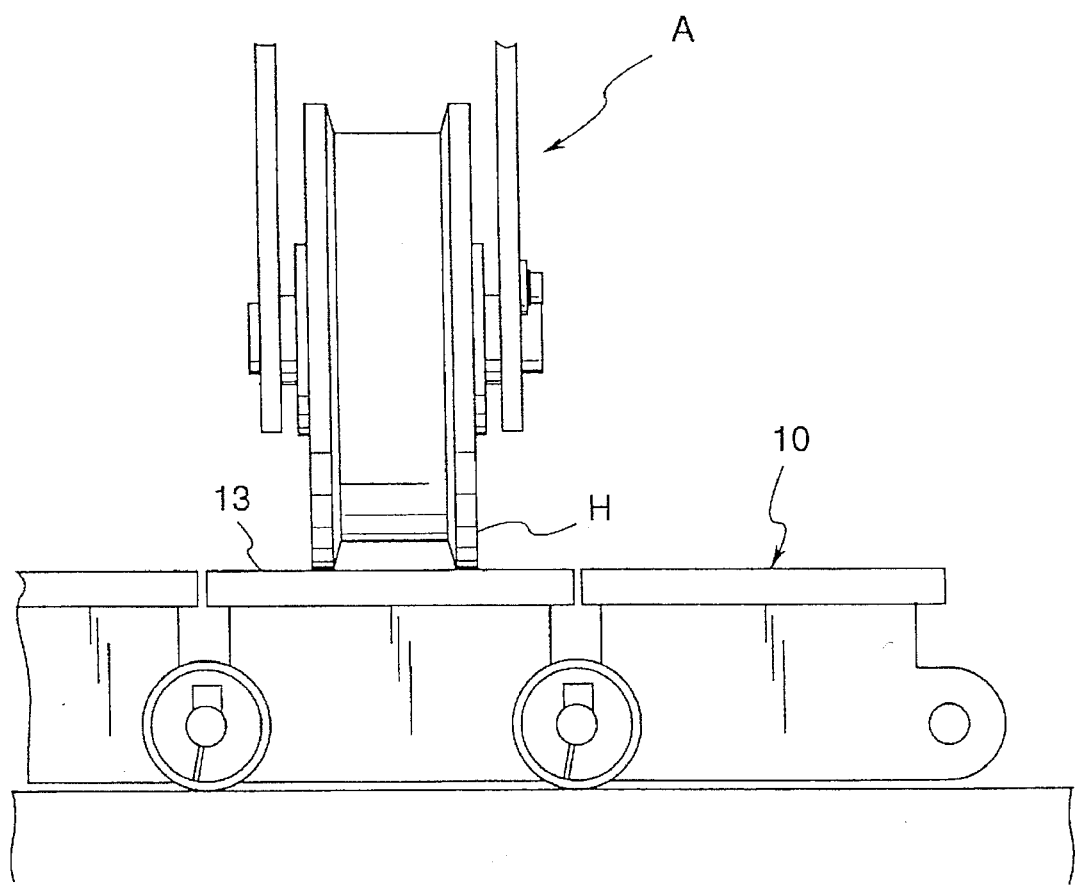
FIG. 7 is a side view of the conventional traverser taken from the left side.

Like the foregoing conventional traverser 10 of FIG. 6, a traverser 20 is installed, for example, at an car assembly line, wherein a truck is conveyed from a pair of carry-in rails 21, 21, as shown in FIG. 1, to a pair of carry-out rails (not shown), thereby changing the running direction of the truck. The truck is loaded with a car body which is under assembly.

The traverser 20 includes a drive motor 22, chains 23, 26, slats with a groove (support member) 24, 27, and a flat slat 25.

The drive motor 22 is mounted on a mounting frame 30 of the traverser 20, wherein the drive motor 22 is equipped with a speed reducer 31 which is mounted en an output shaft thereof.

The speed reducer 31 is connected to a chain drive shaft 32, which is pivotally mounted on the mount frame 30. Because the speed reducer 31 is mounted on the chain drive shaft, a space in which the speed reducer occupies can be reduced.

Figure 2:
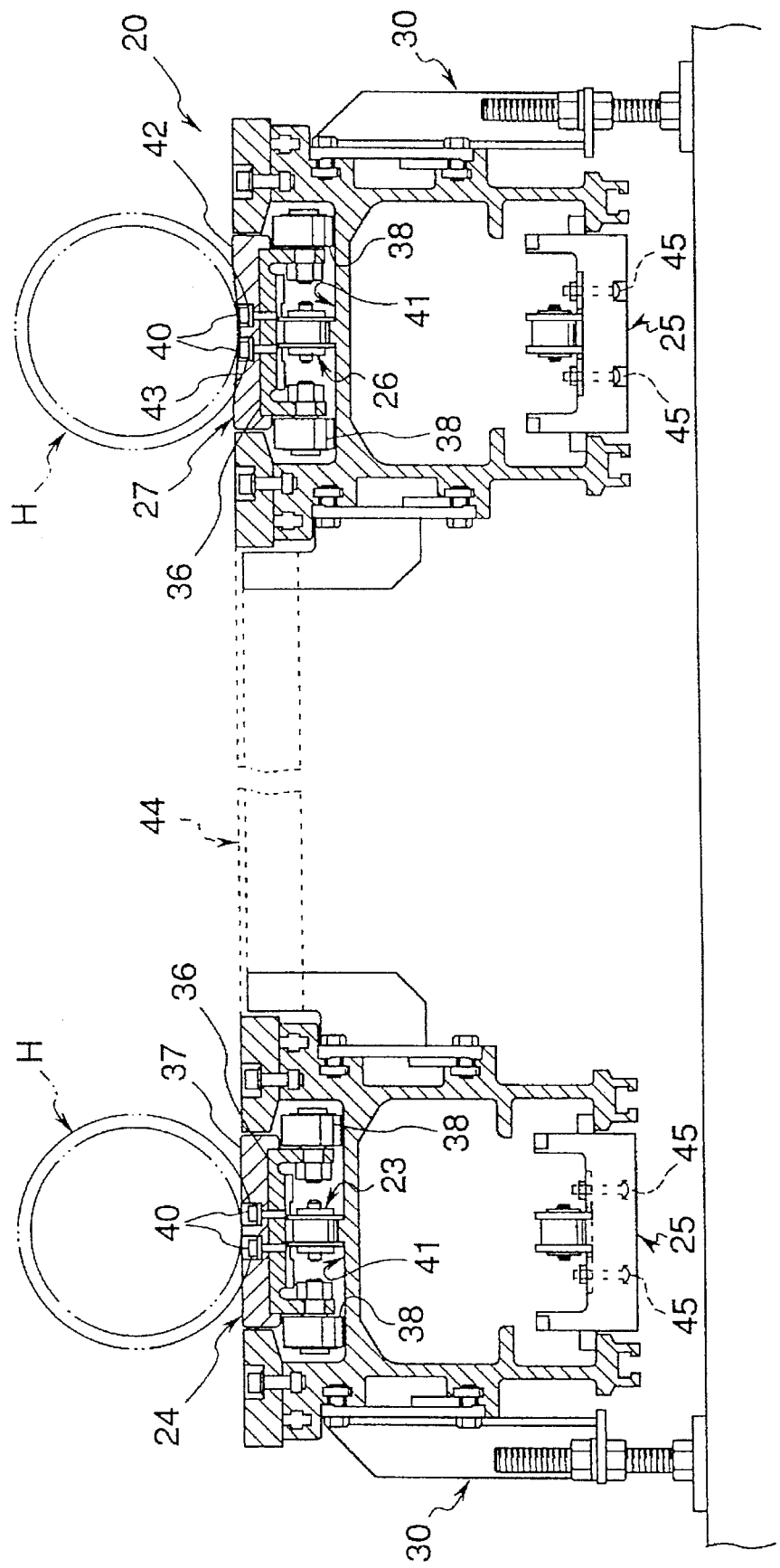
FIG. 2 is a cross sectional view thereof taken along line 2—2 of FIG. 1.

The chain 23, 26, FIG. 2, is mounted on the chain drive shaft 32 and surrounds a sprocket (not shown) which is engaged therewith. The slat with a groove 24, 27, including a groove 35 formed on an upper surface thereof, and a flat slat 25 having a flat upper surface, are mounted on each chain 23, 26, FIG. 1.

The slats with a groove 24, 27 are made by casting and are mounted on the chain 23 at a position corresponding to the positions of the four wheels H of the truck.

Figure 3:
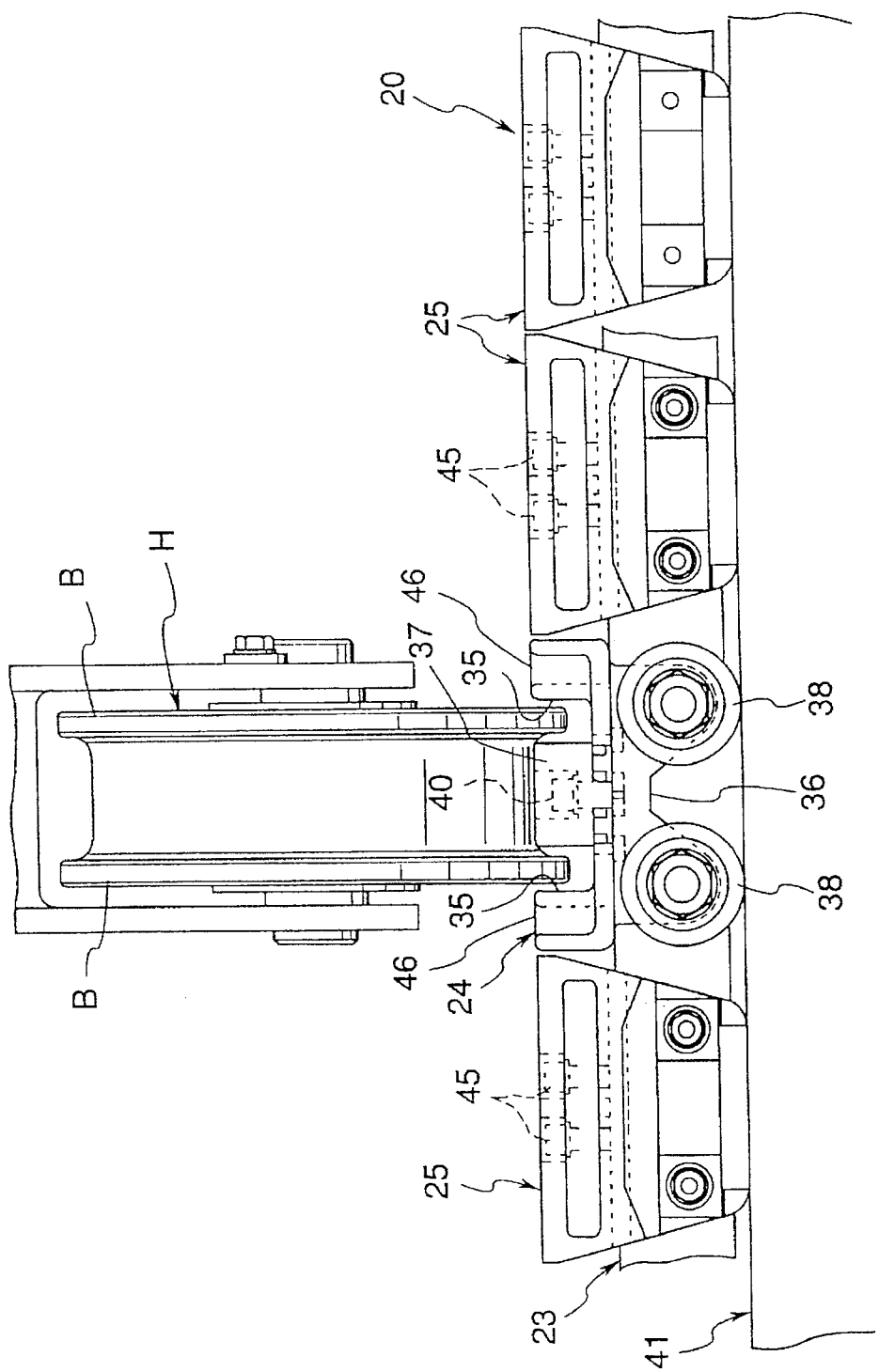
FIG. 3 is a side view of a slat with a groove shown in FIG. 1 taken from the left side.
Figure 4:
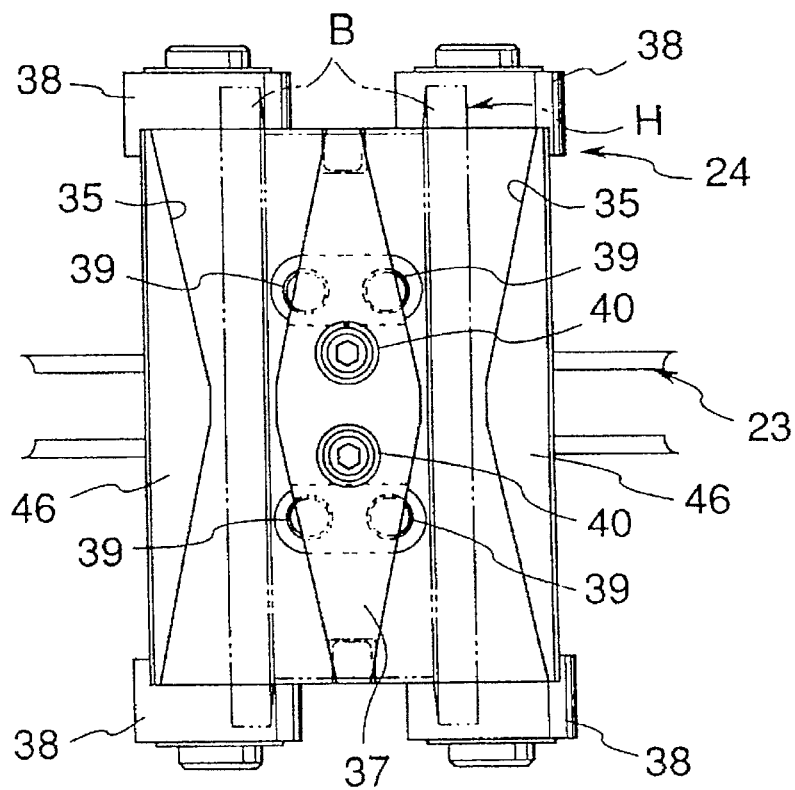
FIG. 4 is a plan view of the slat with a groove.

As shown in FIG. 2 through FIG. 4, the slat with a groove 24 includes a frame 36, a separate plate 37 and roller 38.

The frame 36 is mounted on the chain 23 by means of four bolts 39, FIG. 4. Side walls 46, 46 are mounted, vertically elongated, on the frame 36 to form a U-shaped cross section. The separate plate 37, forms a rhombus-shaped and is detachably mounted on the frame 36 by means of two bolts 40.

The separate plate 37 and side walls 46, 46 form a pair of grooves 35, 35 for receiving flanges B, B of the wheel H, wherein the width of the upper end of the groove 35 is formed to be wider than the width of the central lower end thereof so that the flange B of the wheel can easily enter the groove 35.

The roller 38 is mounted on the frame 36, two rollers on each of the sides thereof, and runs on a chain guide rail 41 on which the chain 23 runs.

A recessed portion 43 is formed at the central portion in a direction perpendicular to the moving direction of the chain 26, on the upper surface of the separate plate 42 of the slat with a groove 27 mounted on one of the chains 26, FIG. 2.

In the slat with a groove 27, like the foregoing slat with a groove 24, the separate plate 37 and side walls (not shown) form a pair of grooves 35, 35, FIG. 1, for receiving flanges B, B of the wheel H, wherein the roller 38 is rotatably mounted on the frame 36, FIG. 2.

Figure 5:
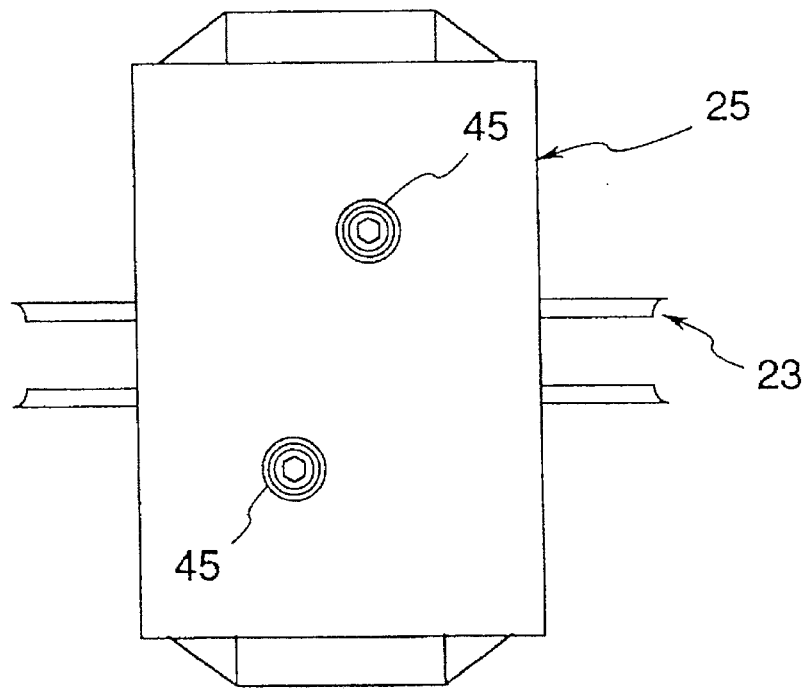
FIG. 5 is a plan view of a flat slat.

As shown in FIGS. 2, 3 and 5, each of the flat slats 25 is mounted on each of the chains 23, 26 by means of two bolts 45 inside the slat with a groove 24, 27, respectively. The flat slat 25 slides on the chain guide rail 41.

It is noted that the flat slat 25, in itself, is not necessarily mounted. However, if the flat slat 25 is not mounted, there are several blank spaces created which correspond to where the flat slat 25 would be mounted on the surface of the traverser 20. The blank spaces may cause the operators to trip and fall, tools may be dropped into the blank spaces, or dust, dirt, etc. may enter the blank spaces. Therefore, the flat slat 25 should be mounted to prevent these occurrences by filling up the blank spaces.

Because the flat slats 25 slide along the chain guide rail 41, when not loaded with a truck, the flat slats 25 are made of resin molding materials, thereby reducing weight of the flat slats 25 and enabling the flat slats 25 to slide smoothly. Furthermore, when the flat slats 25 are made out of resin molding materials either a small motor with small driving force power and small chain can be used or the speed reducer 31 mounted on the chain drive shaft 32 can be used in which case the entire thickness of the traverser 20 can be made thinner.

In this regard, if the flat slats 25 are made of casting materials, and a speed reducer is to be mounted on the frame 30, the entire thickness of the traverser would range from about 600 mm to about 900 mm. In contrast, according to the present invention, when the flat slats 25 are made of resin molding materials and the speed reducer 31 mounted on the chain drive shaft 32 is used, the entire thickness of the traverser 20 can be about 300 mm.

A blind plate 44 is mounted between the two rows of the slat with a groove 24, 27 and flat slat 25, thereby making the upper surface of the entire traverser 20 flat.

The mount position of the slat with a groove 24, 27 and the flat slat 25 may be changed, corresponding to the interval between a pair of the carry-in and carry-out rails connected to the traverser 20, by removing the bolts 39, 45.

Further, each of the separate plates 37, 42 may be exchanged with each other by removing the bolt 40. Furthermore, the interval of the grooves 35, formed at the slats with a groove 24, 27, may be changed by exchanging the separate plates 37, 42 so that the interval of the grooves 35 can correspond to the interval of the flange B of the wheel H.

Next, the operation of the structure for preventing position deviation of a truck loaded on a traverser of the present invention will now be described hereinafter.

The truck A, loaded with a car assembling body, runs on the carry-in rail 21, while the slats with a groove 24, 27 are waiting for the trucks A at an extension of the carry-in rail 21.

The trucks A are translated to the slats with a groove 24, 27 and the flange B of the wheel H enters the groove 35.

One of the wheels H is droped into the recessed portion 43 of the slat with a groove 27, thereby preventing the truck from deviating, in a right-left direction as viewed in FIG. 2, from the running direction of the chain 23 during the moving of the slats with a groove 24, 27.

Then, the slats with a groove 24, 27, driven by the chains 26, 26, move therewith and stop at the carry-out rail (not shown), during which the flat slats 25 move integrally with the chain 23.

Needle bush chains are well known and are used as the chains 23. Because the needle bush chains include a needle bearing interposed between a pin and a bush so that the friction therebetween can be reduced, extension of the whole length is smaller than that of the other kinds of chains. Accordingly, the slats with a groove 24, 27 can be made to stop on the extension of the carry-out rail.

On the other hand, an inertial force is generated against the truck in the direction of movement thereof when the chains 23, 26 start and stop. The trucks will try to slip in the direction of the inertial force on the slats with a groove 24, 27. However, because the flange B of the wheel H is engaged with the groove 35 and regulated thereby, the slip of the trucks on the slats with a groove 24, 27 can be prevented.

Accordingly, not only because the slats with a groove 24, 27 stop on the extension of the carry-out rail, but also because the slip of the truck on the slats with a groove 24, 27 can be prevented, the truck can be smoothly transferred to the carry-out rail.

As will be understood from the foregoing, according to the structure for preventing position deviation of a truck loaded on a traverser of the present invention, because the wheel of the truck, while moving on the support member, is engaged with the groove, the slip of the truck on the support member due to an inertial force against the truck on starting or stopping can be prevented. Accordingly, damage to the wheel of the truck and the support member can be prevented.

Further, if the slip of the truck on the support member is prevented, the truck can be made to stop on the extension of the carry-out rail, thereby enabling the truck to smoothly transfer to the carry-out rail.

Furthermore, if the truck does not slip on the support member, the carry-out rail does not need the guide members, thereby eliminating the projecting objects and improving the safety of the operators' feet.

What is more, the sensor detecting that the truck reaches the carry-out rail can be omitted, thereby simplifying the construction of the traverser.

The terms and expression which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. The traverser, comprising:

a carry-in rail having first and second ends;

a carry-out rail having first and second ends, wherein said carry-out rail is disposed parallel to said carry-in rail;

a chain mounted between said carry-in rail and said carry-out rail; and a support member having a substantially flat upper surface and being driven by said chain so as to be movable between said carry-in rail and carry-out rail in order for said support member to transfer a truck from said carry-in rail to said carry-out rail, wherein said upper surface of said support member includes grooves for receiving respective flanges of a wheel of said truck, each of said grooves having a bottom surface lower than said upper surface of said support member.

* * * * *